United States Patent Office 3,549,978
Patented Dec. 22, 1970

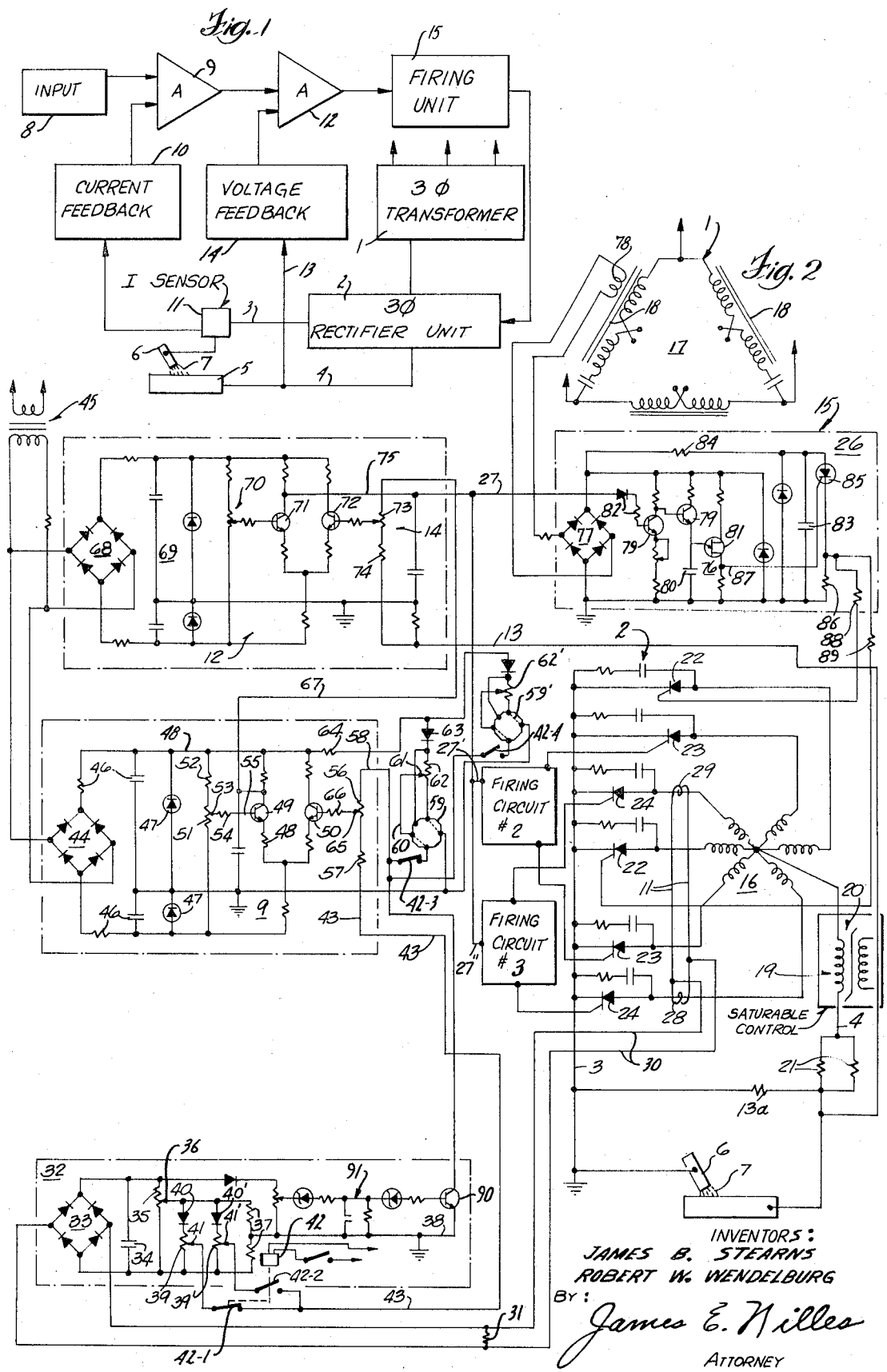

3,549,978
DIRECT CURRENT ARC POWER SUPPLY WITH STABILIZED FEEDBACK CONTROL
James B. Stearns, Elm Grove, and Robert W. Wendelburg, Milwaukee, Wis., assignors to Chemetron Corporation, Chicago, Ill., a corporation of Delaware
Filed Apr. 25, 1969, Ser. No. 819,204
Int. Cl. B23k 9/10; H02m 7/20
U.S. Cl. 321—19                                13 Claims

ABSTRACT OF THE DISCLOSURE

A three phase transformer and full wave rectifier including controlled rectifiers. A feedback control system includes a pair of separate and cascaded summing differential amplifiers. The first amplifier is interconnected to sum the set voltage input signal and current feedback signal. The second amplifier is connected to sum the output of the first amplifier and the voltage feedback signal. The current feedback signal is either positive or negative to provide a desired slope.

BACKGROUND OF THE INVENTION

This invention relates to a direct current arc power supply having an improved stabilizing feedback circuit and particularly, to such a power supply for establishing and maintaining an arc between a pair of spaced electrodes, for example, as in arc welding.

Direct current power supplies for establishing and maintaining of an arc between a pair of electrodes generally may employ a transformer reducing the incoming line voltage, with the output of the transformer full wave rectified for establishing a suitable direct current voltage and current output. A highly satisfactory arc welding power supply is disclosed in U.S. Pat. 3,337,769 wherein a polyphase transformer-rectifier system is disclosed having current and voltage feedback control for determining the desired phasing or firing of silicon controlled rectifiers forming a full wave triggered rectification means. The system of the above patent includes a voltage and current feedback control interconnected in common with a voltage setting control to a summing network. The current feedback provides an adjustable means for controlling of the slope control and the voltage feedback maintains a constant voltage output. Although this circuit has been found to provide a highly acceptable and commercially practical arc welding power source for arc welding, the circuit may unstable under certain operating conditions. It was also found desirable to include a series resistor in the output circuit for short arc type welding. This introduced a natural sloping characteristic. However, this resulted in a system whereby it was generally impossible to obtain a very flat or zero slope characteristic for other types of welding. Thus, although the system provided a highly practical system it does not provide optimum characteristics for certain welding applications.

SUMMARY OF THE PRESENT INVENTION

The present invention is particularly directed to an improved arc power supply which can be employed in applications without the adverse characteristics present in the previous control systems. Generally, in accordance with the present invention, the feedback control system includes a pair of separate and cascaded summing circuits, the first of which is interconnected to sum the set voltage input signal and the current feedback signal and the second of which is connected to sum the output of the first summing network and the voltage feedback signal. The output of the second summing network is interconnected to control the several firing networks for the triggered full wave rectifying circuit. Thus, applicant realized that the cause of the problem in the previous structures was the simultaneous summation of opposite functions by the common network. Thus, the current feedback signal was subtracted from the reference signal for establishing slope control. Simultaneously, the voltage feedback signal was added to the reference signal to produce the desired constant voltage output. Under certain conditions in the control system, the opposite functions at the common summing point apparently established an unstable condition. The present circuit had been found to essentially completely eliminate this instability.

In a highly satisfactory and novel construction, each of the summing networks includes a differential transistorized amplifier. The output transistor in the differential amplifiers are connected to a full wave filtered and regulated power supply to establish an operating point. The second transistor of the differential amplifiers was connected to a summing resistor or potentiometer, one side of which was interconnected to the reference input signal and the opposite side of which is connected to the feedback signal. Thus, the current feedback summing amplifier has the feedback side of a summing resistor interconnected to a current feedback signal and the opposite side connected to a preset voltage signal. The output transistor of the current amplifier is connected directly to the current side of the summing resistor of the voltage feedback circuit. The opposite side of the summing resistor in the voltage feedback circuit is connected to the voltage feedback line. The output transistor of the voltage differential amplifier of the voltage feedback circuit is connected in common to the several firing circuits for the triggered rectifiers of the full wave rectifying circuit.

The current feedback includes a separate slope adjustment circuit interconnected between the current sensor and the input to the feedback summing amplifier. Generally, the slope circuit includes full wave rectifying of the current feedback signal with the DC output filtered and applied to a voltage dividing network. An intermediate point in the voltage dividing network is interconnected to the balance of the circuit to define a common ground line. A slope adjustment potentiometer is connected across this voltage dividing network. The output of the adjustment potentiometer is now either positive or negative with respect to such common ground depending upon the position of the setting of the potentiometer. Thus when it is applied to one end of the potentiometer, a negative feedback signal is fed to the current feedback amplifier or summing resistor. When it is moved to the opposite end, it provides a corresponding positive feedback signal. At an intermediate point, an essentially zero signal is applied to the current feedback summing resistor. As a result of this, the circuit can establish a truely constant potential output having essentially zero slope even though the resistance in the output line tends to establish a drooping characteristic.

The system may employ a completely solid state construction which produces a highly reliable and long life system as well as compensating for ambient temperature conditions of the control circuitry. Thus, as the semiconductor devices increase in temperature, they will tend to decrease in a resistance in direct opposition to the increase in resistance associated with the increase in temperature of the resistors of the circuitry.

The circuit of the present invention thus provides an improved machine having a highly desirable adjustable slope and voltage control with a very stable output which is essentially independent of load, line, and temperature conditions. In particular, applicants found that the apparatus is highly satisfactory for welding with the short arc or spray transfer mode of operation and that the arc will run essentially completely smooth, stable, and relatively spatter free for all wire sizes and types.

BRIEF DESCRIPTION OF THE DRAWINGS

FIG. 1 is a block diagram of the power supply and control circuitry for an arc welding system constructed in accordance with the present invention; and FIG. 2 is a schematic circuit diagram illustrating the preferred construction of the present invention shown in FIG. 1.

DESCRIPTION OF THE PREFERRED EMBODIMENT

Referring to the drawing and particularly to FIG. 1, the illustrated embodiment of the invention includes a polyphase welding transformer 1 providing an alternating current input to a full wave polyphase rectifier unit 2. A pair of output leads 3 and 4 are connected to the rectifier with the lead 3 shown as a positive lead and the lead 4 shown as a negative lead. In the illustrated embodiment of the invention, the negative lead is connected to a work member 5 and the positive lead 3 is connected to an electrode 6. When the power supply is energized, an arc 7 is established and maintained between the electrode 6 and the work member 5. For proper arc welding, the voltage across the electrode and the work member 5 is pre-set and maintained at an essentially constant arc voltage. In the illustrated embodiment of the invention, a reference voltage input 8 is connected to one side of a current feedback summing amplifier 9. The second input of the amplifier 9 is connected via a current feedback unit 10 to a current sensing unit 11 connected to establish a signal proportional to the current through load line 3. The output of the summing amplifier 9 is connected as a first input to a voltage feedback summing amplifier 12. The second input of the amplifier 12 is connected to voltage signal leads 13 connected across the leads 3 and 4, and particularly a load resistor 13a via a voltage feedback network 14. The output of the amplifier 12 is therefore, a modified voltage signal related to the slope characteristic established by the current feedback and in turn modified by the desired constant voltage characteristics. The output of the amplifier 12 is connected to a firing unit 15 which is adapted and interconnected to the rectifier unit 2 to produce properly timed spaced firing pulses to the bank of triggered rectifiers, which are subsequently described, for proper phasing of the rectifier network to establish and maintain the desired voltage across the electrodes 6 in the work 5 and therefore, across arc 7.

The separate summing of the feedback signals in combination with the current feedback network have been found to provide a very stable and reliable circuit operation. A preferred construction of one embodiment of the circuitry is shown in FIG. 2.

Referring particularly to FIG. 2, the transformer 1 is illustrated as a three phase transformer having a six phase star secondary 16 and coupled to a three phase delta-connected primary 17. The windings of the primary and secondary are suitably coupled on a common core 18 to establish a constant potential transformer for establishing a similar output at the leads 3 and 4.

The common or star point of the secondary 16 is connected in series with a control winding 19 of a saturable reactor control unit 20 and a pair of parallel slope control resistors 21 to the work 5. The saturable reactor control unit 20 provides variable inductance in series with the welding arc 7, particularly for short arc welding characteristics. The saturable reactor control unit is preferably constructed in accordance with the disclosure in the teaching of applicants' co-pending application entitled "Direct Current Power Supply With Adjustable Inductance Control," Ser. No. 819,334 which was filed on Apr. 25, 1969 the same day as this application and is assigned to the same assignee. No further description of the inductance control is therefore included herein.

The resistors 21 are preferably Nichrome slope control resistors which limit the short circuit currents and establish a smoother arc when employing the machine in short arc or spray type transfer welding. Although this tends to introduce a natural sloping characteristic as hereinafter described, the current feedback system of the present invention is constructed to maintain the desired flat slope characteristics.

The outer end of each phase winding of the secondary 16 is similarly connected to the lead 3 in series with a silicon controlled rectifier. The diametrically opposite phase windings of the star connected secondary are connected by simultaneously conducting controlled rectifiers. Thus, one phase is connected by a pair of controlled rectifiers 22 to the line 3, an adjacent phase is connected by a similar pair of rectifiers 23 and the final phase pair are connected by a final pair of rectifiers 24. Each pair of controlled rectifiers 22–24 is connected to the firing circuit for simultaneous pulsing, with the three pairs being pulsed in proper sequence. Thus, the portion of the half-wave of each winding applied across the leads 3 and 4 is controlled by the phased firing of the related control rectifiers 22 through 25.

The paired rectifiers are connected to corresponding firing circuit of which the circuit 26 for rectifiers 22 is shown in detail. The other firing circuits for rectifiers 23 and 24 are similarly constructed and consequently are shown in appropriately labeled blocks. The firing circuit 26 is energized via an input line 27 connected to the output of amplifier 12 as shown in FIG. 1. The signal at line 27 determines the particular time in each half cycle of the related phase voltage applied to rectifiers 22 at which a firing pulse is applied to the rectifiers 22 and thereby determines the particular time in the phase that the related rectifier 22 conducts the output of the related secondary. As hereinafter described, the power input to the firing circuit 26 is synchronized with the voltage applied to the rectifiers 22. This input is further modified by the input signal at line 27 which reflects the current feedback network 10 and the voltage feedback network 14 through summation in amplifier 9 and 12 to establish a desired constant output voltage having a predetermined slope.

In FIG. 2, the current sensing unit 11 includes a pair of windings 28 and 29 coupled to the leads from the phase winding to the anodes of rectifiers 24. The windings are connected in parallel with the output leads 30 connected to the current feedback network 10. A current feedback resistor 31 is shown connected across the leads 30. The current feedback network 10 includes a separate slope circuit 32, the output of which is interconnected into the summing amplifier 9.

The illustrated slope circuit 32 includes a full wave bridge diode rectifier 33 connected across the leads 30 and establishing a pulsating direct current related to the current in the leads of rectifiers 24 and thus, in lead 3. The output of the rectifier 33 is filtered by a parallel capacitor 34 to form a filtered direct current signal which is impressed across a potentiometer 35 having a tap 36. The potentiometer 35 further defines a voltage divider for reducing or adjusting the feedback signal for differences in current transformer outputs for a given input as a result of manufacturing differences and the like, such that proper maximum slope can be achieved. The tap 36 of the potentiometer and the common end of the potentiometer 35 are connected across a further voltage dividing network consisting of a pair of series connected resistors 37. The common junction of the resistors 37 is connected to a line 38 which defines a common return or ground line for the control circuit. For purposes of simplicity of illustration, the several ground connections are shown by a conventional ground symbol. In an actual construction, the several grounded terminals are interconnected by suitable conductor or conductors.

A current pick-off circuit is connected in parallel with the voltage dividing resistors 37 and includes a first potentiometer 39 in series with a diode 40. The tap 41 of the poteniometer 39 thus provides a DC signal proportional to the current feedback signal. The potentiometer is connected via a set of normally closed contacts 42–1 of a dual control relay 42 to a feedback current line 43 to provide a current feedback signal to the amplifier 9 as hereinafter described.

The combination of the adjustable potentiometer 39 in parallel with the voltage dividing network 37 permits both negative and positive feedback with respect to the common ground line 38. When the tap or slider 41 is toward the bottom side of the potentiometer 39 in FIG. 2, a negative feedback signal is fed to the summing amplifier 9. As the slider 39 is moved upwardly, a voltage is established at some point which is essentially at zero with respect to the common ground line 38 and a corresponding zero current feedback signal is established. Movement of the slider 39 above that point creates a positive current feedback signal at line 43. This system is of particular significance in a welding power supply employing the series resistance 21 or any other similar load lead element which creates a natural slope in the output circuit. Thus, for optimum functioning the circuit or power supply should have the capability of establishing a true constant potential characteristic, that is one having a zero slope. This requires however, with the resistors 21, a positive feedback signal when a zero slope is desired and furthermore, that the positive feedback signal increases with an increasing load current in order to compensate for the inherent voltage drop appearing across the nichrome resistors 21.

Further, the resistors 21 cannot normally provide the desired maximum drive or slope for certain welding processes. Consequently, the negative signal must be supplied through the slope circuit 32 such that the current feedback circuit decreases as the output current increases with the resulting desired maximum slope.

Applicant has found that the illustrated slope adjustment circuit, particularly in combination with the current feedback amplifier 9 as presently described, produces a true adjustment of the output characteristic between a positive slope, a zero slope, and a negative slope characteristic and thus permits application of the supply system to widely varied types of direct current arc welding.

In the illustrated embodiment of the invention, a pair of slope control adjustments are provided and selectively connected into circuit to the contacts of relay 42. The illustrated potentiometer 39 is normally connected in circuit through the normally closed contact 42–1 and a similar potentiometer circuit identified by corresponding primed numbers is connected in parallel with the circuit of potentiometer 39 and selectively connected into the circuit of lead 43 via a set of normally open contacts 42–2. The relay 52 is selectively connected to control power lines to permit selective interconnection of the potentiometers 39 and 39' into the circuit. Although not shown, suitable interlocking relays may also be provided to insure that only one of the potentiometers is connected into circuit at any given time. The illustrated dual control is shown for purposes of illustration, particularly because the present invention is particularly adapted to be incorporated into a dual welding machine more fully disclosed in applicants' co-pending application, Ser. No. 819,333, filed Apr. 25, 1969 entitled "Arc Welding Power Supply Assembly." The power and control circuit of the present invention may also be constructed as an essentially complete solid state system with the several modules shown and described formed on separate plug-in circuit boards such as disclosed in the above application.

Either potentiometer 39 or 39' produces a similar modified current feedback signal at the lead 43 which in turn is interconnected to the summing amplifier 9 as follows.

The illustrated current feedback amplifier 9 includes a full wave bridge rectifier 44 connected to one phase of the incoming power lines via a suitable transformer 45 to provide a DC bias supply. The output of the rectifier 44 is filtered by a suitable resistor-capacitor network 46 including a pair of series connected Zener diodes 47 connected directly across the filtered circuit. The junction of the Zener diodes 47 is grounded to define the common return line for the system. The network 46 and Zener diodes provide a regulated positive voltage, for example 18 volts at the upper line 48, suitable for operating of the amplifier. The amplifier proper is a differential transistor amplifier including a pair of NPN transistors 49 and 50 parallel connected across the Zener diodes 47, in a well known differential amplifying circuit. A voltage dividing network including a potentiometer 51 in series with a dropping resistor 52 is connected across the Zener diodes 47. The slider or tap 53 of potentiometer 51 is connected in series with the resistor 54 to the base 55 of transistor 49 producing a bias circuit tending to turn on the transistor 49 and establish an output signal at its collector. The opposite or second transistor 50 of the differential amplifier is connected to be energized from a summing resistor or potentiometer 56, the one side of which is connected via resistor 57 to the current feedback line 43. The opposite side of the summing resistor 56 is connected via a lead 58 to a remote voltage receptacle 59 in series with a set of normally closed contacts 42–3 of the selector relay 42. For the dual control system heretofore discussed, a pair of receptacles 59 and 59' are provided for selectively connecting into the circuit different voltage controls by selective energization of the relay 42. Thus, unit 59 is normally in circuit. Energization of relay 42 opens contacts 42–3 and closes a set of normally open contacts 42–4 associated with the corresponding terminal of the receptacle 59'. Thus, receptacles 59 and 59' are well known devices and the circuit with the local voltage control is described. The internal receptacle connections are shown by dotted line connections within the receptacle 59. Thus, the lead 58 is connected to a lead 60 by the receptacle 59. The lead 60 is in turn connected to a potentiometer slider or tap 61 of an input voltage adjustment potentiometer 62 defining the input control 8 of FIG. 1. The potentiometer 62 has a one side connected in series with a diode 63 and a common dropping resistor 64 to the positive side or line 48 of the regulated voltage output of the rectifier 44. The opposite side of potentiometer 62 is connected through the receptacle 59 to the common ground.

Thus, in the operation of the system, the potentiometer 51 is set to establish a predetermined bias on the transistor 49. The potentiometer 62 is set to establish a predetermined voltage, related to a desired output voltage, to the one side of the summing resistor 56. The voltage on the other side is determined by the current feedback circuit and particularly the voltage of line 43. A potentiometer tap 65 of the potentiometer 56 connects the voltage through a limiting resistor 66 to the base of the transistor 50. Thus, the voltage applied to the transistor 50 is proportional to the summation of the reference or pre-set voltage established by potentiometer 62 less the voltage appearing at line 43. The output of the differential amplifier 9 which appears at a lead 67 connected to the collector of transistor 49 is therefore, directly proportional to the summation of the reference input voltage and the current feedback voltage.

The current feedback modified signal appearing at line 67 is applied to the voltage feedback network and particularly, amplifier 12.

The voltage feedback system generally is similar to that of the current feedback system and includes the differential transistor amplifier including a pair of transistors connected to a regulated DC supply including a full wave bridge diode rectifier 68 connected across the output of transformer 45 and a regulating network 69. A voltage dividing potentiometer 70 is similarly connected to one transistor 71 of the differential amplifier and biases transistor 71 to conduct. The opposite transistor 72 of the differential amplifier is connected in a bias network to a summing resistor 73, the one side of which is connected to the current feedback line 67 and the opposite side of which is connected via a resistor 74 to the voltage feedback line 13. The output of the differential amplifier is taken off the collector of the transistor 71 via a line 75 which is connected in common to the input lines 27, 27' and 27" for the several firing circuits 26.

The differential summing amplifiers 9 and 12 eliminate the need for large filter capacitors in the networks and establishes a vary rapid response time. For example, turn-on time between application of power as by contactor closing and the establishment of the set current and voltage has been within the order of two cycles of the input power. Similarly, the voltage and current feedback circuits have a response within the two cycles such that the necessary adjustment or compensation is created within two cycles and essentially without delay.

The illustrated firing circuits employ a unijunction pulsing circuit 76 having a full wave bridge rectifier 77 connected to a corresponding phase through a phase winding 78 which is wound on a corresponding phase of the primary 17 of transformer 1 similar to the system shown in the Buchanan Pat. 3,337,769. The output of the rectifier 77 is not filtered and provides an in-phase charging current to the unijunction pulsing circuit 76 which includes a two stage amplifier including transistors 79 connected to control the charging of a firing capacitor 80 in the circuit of a unijunction transistor 81 generally similar to that shown in the Buchanan Pat. 3,337,769. The input transistor 79 is connected to line 27 via a series connected diode and resistor 82. The output of the unijunction circuit 76 in the illustrated embodiment of the invention however, controls the discharging of a capacitor 83 which is connected in series with a resistor 84 directly across the output of the rectifier 76. A silicon controlled rectifier 85 in series with a resistor 86 is connected across the capacitor 83. The output of the unijunction transistor 81 is connected via a signal line 87 to the gate of the controlled rectifier 85. Thus, between the firing periods of the unijunction transistor 81, the capacitor 83 is charged from the rectifier 77. The firing of unijunction transistor 81 fires the controlled rectifier 85 which conducts and discharges capacitor 83, thereby generating a corresponding voltage across the resistor 86. A pair of resistors 88 and 89 are connected in common at one end to the junction of the controlled rectifier 85 and the resistor 86 with the opposite ends connected respectively to the gates of the two controlled rectifiers 22 in the main rectifying unit 2. The cascaded power amplifying circuitry as shown is more fully disclosed in applicant co-pending application entitled "Controlled Rectifier Arc Welding Supply Having Improved Positive Firing Characteristics," Ser. No. 819,175, which was filed on Apr. 25, 1969, the same day as the present application and is assigned to a common assignee.

The illustrated circuit also illustrates an overcurrent phase back control to prevent abnormal high level currents, which particularly forms the subject matter of an application entitled "Arc Power Supply with Current Level Control," Ser. No. 819,205, filed on Apr. 25, 1969, the same day as this application and assigned to the same assignee. As more fully disclosed therein, a short circuit transistor 90 is connected to the feedback signal side of the summing resistor 56 and ground. The input to the transistor 90 is interconnected to the rectified feedback signal through a Zener diode sensing and timing network 91. If the current rises above a certain level, the Zener network 91 breaks down and after a predetermined time period, biases the transistor to conduct and ground the current feedback side of the summing resistor which results in phasing back of the trigger circuit for the main control trigger elements to a minimum firing angle.

The operation of the illustrated embodiment of the invention shown in FIG. 2 may therefore, be briefly summarized as follows.

The main power supply connection is completed through any suitable means to energize the main transformer 1 and thereby establish the alterating current output of the secondary 16, the proportion of which is applied across the lines 3 and 4 in accordance with the firing of the controlled rectifiers 22 through 24 inclusive.

The particular firing point is controlled by the firing of the circuits 26 and in particular, the discharge of the related capacitors 83 which in turn is controlled by producing proper phase control voltage signals at lines 27, 27' and 27".

The reference input signal is established by proper positioning of the slider 61 on the reference potentiometer 62 with a consequent corresponding voltage applied to one side of the current summing resistor 56. The current feedback signal is established by the windings 28 and 29 of the current sensor, and modified by the slope adjustment potentiometer 41 to apply a corresponding modified current signal to the opposite side of resistor 56. The differential signal across resistor 56 provides a modulating input to transistor 50 of the current feedback differential amplifier 9 such that the output fed to the voltage feedback differential amplifier 12 reflects the desired slope characteristic superimposed upon the desired otherwise constant output voltage. The differential amplifier 12 similarly compares this signal with the voltage feedback signal at line 13 to apply a proper voltage signal to the firing circuit 26 to produce the necessary phased firing of the controlled rectifiers 22–24 for establishing and maintaining the desired constant output voltage with a selected slope.

What is claimed is:

1. A direct current arc power supply for establishing and maintaining an arc between a pair of electrode members, comprising a power circuit means connected to a pair of output means for connection to the electrode members, a set input signal means to establish a signal related to a desired output at said output means, current sensing means coupled to the output means to sense the arc current, voltage sensing means coupled to the output means to sense the arc voltage, a first summing means connected to the input signal means and to the current sensing means to establish a slope control signal in accordance with a comparison of the two signals, and a second summing means connected to the first summing means and to the voltage sensing means to establish a voltage control signal in accordance with a comparison of the two corresponding signals, said second summing means being connected to the power circuit means to control the output.

2. The direct current arc power supply of claim 1 wherein said each of said summing means includes a summing amplifier having a first input means connected to a presettable input and a second input means connected to the two corresponding signals.

3. A direct current arc power supply for establishing and maintaining an arc between a pair of electrode members, comprising a plurality of triggered rectifier means interconnecting an alternating current input and full wave rectified output leads for connection to the electrode members, a set input signal means to establish a signal related to a desired rectified output voltage, current sensing means coupled to the rectifier means to sense the arc current, voltage sensing means coupled to the rectifier means to sense the output voltage, a first summing means connected to the input signal means and to the current sensing means to establish a slope control signal in accordance with a comparison of the two signals, and a second summing means connected to the first summing means and to the voltage sensing means to establish a voltage control signal in accordance with a comparison of the two corresponding signals, said second summing means being connected to the rectifier means to control the conduction thereof.

4. The direct current arc power supply of claim 3 wherein each of said summing means includes a differential amplifier having a first input means connected to a presettable fixed bias supply and a second input means connected to the two corresponding signals.

5. The direct current arc power supply of claim 3 wherein said first summing means includes a differential amplifier having a first input means connected to a set bias supply and a second input means connected to the current sensing means and to the set input signal means, said current sensing means including means to selectively establish opposite polarity feedback signals.

6. The direct current arc power supply of claim 3 wherein said current sensing means includes means to selectively establish opposite polarity feedback signals.

7. The direct current arc power supply of claim 3 wherein said triggered rectifier means are interconnected in a three phase full wave rectifying circuit having an alternating current input transformer, a nichrome resistor means connected in one of said output leads, said set input signal means including preset potentiometer having a movable tap, said current sensing means including a current transformer coupled to a pair of phase lines to a related pair of rectifier means, said voltage sensing means including a potentiometer connected across the output leads, said first summing means including a differential amplifier having a regulated bias supply, said current sensing means including rectifying means to rectify the output of the current transformer and to establish opposite polarity signals proportional to the arc current, means connecting said rectifying means and said preset potentiometer to said first differential amplifier, and said second summing means including differential amplifier having a regulated bias supply connected to the first differential amplifier and to the voltage sensing potentiometer to establish a voltage control signal in accordance with a comparison of the two corresponding signals.

8. The direct current arc power supply of claim 3 wherein a resistor means is connected in series with the output of the rectifier means, said current sensing means includes a rectifying means establishing a direct current signal, and a current related signal potentiometer means connected to said rectifying means and connected to the first summing means with an intermediate common voltage reference to selectively establish an adjustable positive current feedback signal and an adjustable negative current feedback signal.

9. The direct current arc power supply of claim 8 wherein said first summing means includes a differential amplifier having a first and a second transistor, a fixed direct current bias supply connected to said transistors and biasing the first transistor to conduct, a summing resistor means having an adjustable means connected to the second transistor and biasing the second transistor to conduct, one side of said summing resistor means being connected to the potentiometer means and the opposite side being connected to the set input signal means, said second summing means includes a differential amplifier having a third and a fourth transistor, a fixed direct current bias supply connected to said transistors and biasing the third transistor to conduct, a second summing resistor means having an adjustable means connected to the fourth transistor and biasing the fourth transistor to conduct, one side of said second summing resistor means being connected to the output of the first differential amplifier and the opposite side being connected to the voltage sensing means.

10. The direct current arc power supply of claim 3 wherein a resistor means is connected in series with the output of the rectifier means, said current sensing means includes current transformer means coupled to the input to the rectifier means, control rectifier means connected to the current transformer means to establish a direct current signal, a voltage dividing means connected to said control rectifier means and having an intermediate connection defining a common ground reference for the power supply, and a current related signal potentiometer means connected across the voltage dividing means to selectively establish an adjustable positive current feedback signal and an adjustable negative current feedback signal to said first summing means.

11. The direct current arc power supply of claim 3 wherein said first summing means includes a differential amplifier having a first transistor and a second transistor, a fixed direct current bias supply connected to said transistors and biasing the first transistor to conduct, a summing resistor means having an adjustable means connected to the second transistor and biasing the second transistor to conduct, one side of said summing resistor means being connected to the current sensing means and the opposite side being connected to the set input signal means, said second summing means includes a differential amplifier having a third transistor and a fourth transistor, a fixed direct current bias supply connected to said third and fourth transistors and biasing the third transistor to conduct, a second summing resistor means having an adjustable means connected to said fourth transistor and biasing the fourth transistor to conduct, one side of said second summing resistor means being connected to the output of the first differential amplifier and the opposite side being connected to the voltage sensing means.

12. The direct current arc power supply of claim 3, wherein said rectifier means are connected in a full wave three phrase rectifying network, said alternating current input having a three phase transformer with a six phase star connected secondary with each phase winding connected in series with a related rectifier means, wherein a resistor means is connected in series with one output lead, said current sensing means including a pair of current transformers coupled to the input to a pair of phase related rectifier means, control rectifier means connected to the current transformers in parallel to establish a direct current signal, a pair of voltage dividing resistors connected across said control rectifier means and having the intermediate common connection defining a common ground reference for the power supply, a current related signal potentiometer means connected across the voltage dividing means to selectively establish an adjustable positive current feedback signal and an adjustable negative current feedback signal with respect to said ground reference, said first summing means includes a differential amplifier having a first and a second transistor, a regulated direct current bias supply connected to said transistors and biasing the first transistor to conduct, a summing resistor having an adjustable tap connected to the second transistor and biasing the second transistor to conduct, one side of said summing resistor being connected to the current related signal potentiometer means and the opposite side being connected to the set input signal means, said set input signal means including a potentiometer connected to said bias supply and having a tap connected to said summing resistor, said second summing means includes a differential amplifier having a third and a fourth transistor, a regulated direct current bias supply connected to said transistors and biasing the third transistor to conduct, a second summing resistor means having an adjustable tap connected to the fourth transistor and biasing the fourth transistor to conduct, one side of said second summing resistor means being connected to the output of the first differential amplifier and the opposite side being connected to the voltage sensing means, said voltage sensing means including a series resistor connected to the ungrounded side of the output loads.

13. The direct current arc power supply of claim 12 wherein said regulated direct current bias supplies a single phase full wave rectifier, filter networks and a pair of series connected Zener diodes with the common junction of said diodes connected to said ground reference.

References Cited

UNITED STATES PATENTS

| | | | |
|---|---|---|---|
| 3,337,769 | 8/1967 | Buchanan | 315—142 |
| 3,354,384 | 11/1967 | Benjamin | 321—19X |
| 3,371,242 | 2/1968 | Aldenhoff et al. | 315—142X |
| 3,453,526 | 7/1969 | Bowles | 321—19 |
| 3,461,374 | 8/1969 | Rhyne | 321—19X |

WILLIAM M. SHOOP, JR., Primary Examiner

U.S. Cl. X.R.

219—131, 135